United States Patent
Sugisawa et al.

(10) Patent No.: US 7,091,812 B2
(45) Date of Patent: Aug. 15, 2006

(54) INVERTER UNIT

(75) Inventors: Yoshihiro Sugisawa, Numazu (JP);
Masahiko Endou, Numazu (JP);
Masanori Nakagawa, Numazu (JP);
Katsumi Yamamoto, Numazu (JP);
Kaoru Shinba, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 84 days.

(21) Appl. No.: 10/910,831

(22) Filed: Aug. 4, 2004

(65) Prior Publication Data
US 2005/0030769 A1   Feb. 10, 2005

(30) Foreign Application Priority Data

| Aug. 8, 2003 | (JP) | ............................. 2003-289941 |
| Jul. 8, 2004 | (JP) | ............................. 2004-201420 |

(51) Int. Cl.
*H01F 27/30* (2006.01)
(52) U.S. Cl. ...................................... 336/199; 363/212
(58) Field of Classification Search ............... 336/89, 336/199, 200, 212, 213, 218; 363/39
See application file for complete search history.

(56) References Cited

U.S. PATENT DOCUMENTS

| 4,034,410 A | * | 7/1977 | Suzuki et al. ................. 360/55 |
| 6,078,242 A | * | 6/2000 | Tomita et al. .............. 336/212 |

FOREIGN PATENT DOCUMENTS

| JP | 11-122932 | 4/1999 |
| JP | 2003-169483 | 6/2003 |

* cited by examiner

*Primary Examiner*—Adolf Berhane
(74) *Attorney, Agent, or Firm*—Pearne & Gordon LLP

(57) ABSTRACT

An inverter unit comprising component parts including at least an inverter and a filter which removes a high harmonic wave component from an output of said inverter, wherein said component parts are housed in an aluminum case having a bottom wall portion and a side wall portion, said filter includes a coil which is wound around a core extending straight and is arranged at a position closed to one end of said case, an end portion of said core being wound with said coil is arranged closed to an inner surface of said side wall portion of the case, and a ferromagnetic plate, which leads magnetic flux coming in and out said end portion of the core arranged closed to said wall portion of the case to the direction along the inner surface of the side wall portion of the case, is disposed between said end portion of said core and said inner surface of said side wall portion of the case.

5 Claims, 4 Drawing Sheets

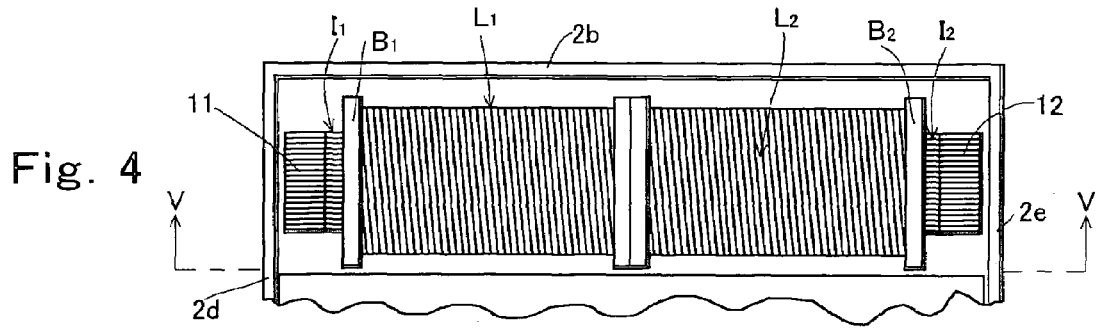
Fig. 4
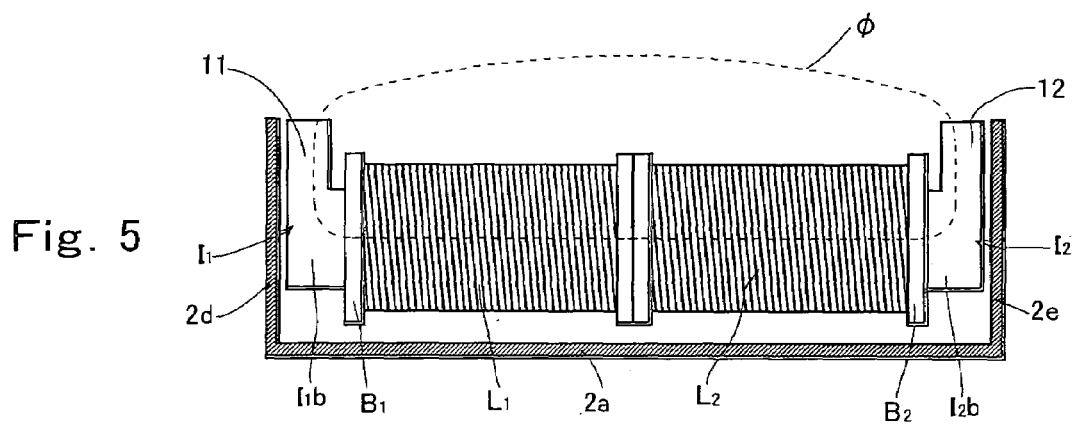
Fig. 5
Fig. 6
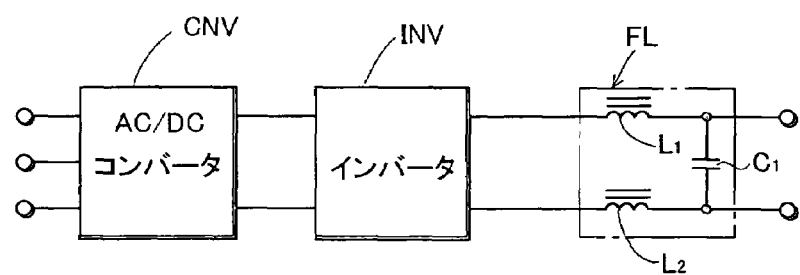

INVERTER UNIT

TECHNICAL FIELD OF THE INVENTION

This invention pertains to an inverter unit for converting an output of a power source being comprised of a generator or the like driven by an internal combustion engine or the like into an AC voltage having a constant frequency.

BACKGROUND OF THE INVENTION

There have been used an inverter unit for obtaining an AC voltage having a constant frequency (generally a commercial frequency) by using a generator driven by a prime mover such as an internal combustion engine as a power source. As shown in FIG. 6, an inverter unit for converting an output of an AC generator into an AC output having a constant frequency includes: an AC/DC converter CNV for converting an output of an AC generator into a DC output; an inverter INV for converting the output of the converter into an AC voltage of a constant frequency; and a filter FL. The filter FL is a low-pass filter having, for example, first and second coils L1, L2 and a capacitor C1, and is provided for removing a high harmonic wave component from the output of the inverter INV.

FIG. 7 is a schematic diagram showing an example of a structure of a conventional inverter unit 401 of this type. In FIG. 7, a reference numeral 402 shows a box-like case having a rectangular shaped bottom wall portion 402a, and a side wall portion comprising side walls 402b, 402c facing to the longitudinal direction of the bottom wall portion 402a and side walls 402d, 402e facing to the cross direction of the bottom wall portion 402a. In the case 402, there are housed component parts of the inverter unit, including the converter CNV, the inverter INV and the filter FL.

The first and second coils L1, L2 of the filter FL are wound around first and second bobbins B1, B2 mounted to first and second cores I1, I2, respectively. In order to maintain the stability of cut-off frequency of the filter with respect to the change of load current, a prismatic core being comprised of a laminated steel plate and extending straight is used as the cores I1, I2 being wound with the coils L1, L2, respectively.

The coils L1, L2 are arranged at a position close to the side wall portion 402b which is one end of the case 402 so that central axes of the coils coincide with each other, and an end portion I1b of the core I1 of the first coil L1 and an end portion (not shown) of the core I2 of the second coil L2 are respectively arranged close to the side walls 402d, 402e facing to the cross direction of the case 402. The capacitor C1 and the component parts of the converter CNV and the inverter INV are mounted to a printed board 403 which is arranged by the coils L1, L2.

It may be possible to arrange the coils L1, L2 at the central of the case 402. However, in this case, the structure of the unit becomes complicated, an outlet of an output line from the filter becomes complex, and the cost increases because of an increase in manufacturing processes, since it becomes necessary to divide the printed board 403 into two parts.

On the other hand, if the coils L1, L2 are arranged on the end portion of the case 402 as shown, it is possible to simplify the structure of the unit since it is unnecessary to divide the printed board 403. In addition, it is possible to make the outlet of the output line from the filter FL to outside easily in the case where the coils L1, L2 are arranged on the end portion of the case 402.

The inverter unit of this type often provides a function as a heat sink to the case 402 in order to improve heat radiation from the converter and the inverter. Also, for preventing the weight of the inverter becoming heavy, it is desirable to use a case as light as possible. Therefore, the case 402 is generally made from aluminum which not only has good heat conductivity but also is light weight.

Although it is not shown in the drawings, resin is cast into the case 402, and at least a part of the component parts of the unit is molded by the resin, so that the inverter unit has water-resisting and earthquake-resisting characteristics. An inverter unit of this type is disclosed in, for example, Japanese Patent Application Laid-Open Publication No. 11-122932.

An inverter unit shown in FIG. 7 includes an AC/DC converter CNV for converting an AC output of a generator into a DC output because it is assumed that an AC generator is used as power source. However, the AC/DC converter may be omitted in the case where an output of a DC power source such as a storage battery and a solar battery is converted into an AC output of constant frequency.

As shown in FIG. 7, if the coils L1, L2 are disposed at the end portion of the case 402 made of aluminum, and the end portions of the cores I1, I2 being wound with the coils L1, L2, respectively, are arranged closed to the inner surface of the side walls 402d, 402e of the case 402, the magnetic flux coming in and out the end portions of the cores I1, I2 flows through the side walls 402d, 402e of the case. If an AC magnetic flux flows through the side walls 402d, 402d of the case, eddy current flows at the side walls 402d, 402e. Then, since magnetic flux generated by the eddy current prevents an AC magnetic flux flowing through the cores I1, I2 from changing, magnetic resistance of the cores I1, I2 is increased, and inductance of the coils L1, L2 is decreased.

Therefore, it has been necessary for the conventional inverter unit of this type to make the coils L1, L2 have larger inductance than their needs, with making allowance for its possible reduction of inductance of the coils L1, L2. Thus, it was inevitable for the coils L1, L2 to be large and the cost to be expensive.

To avoid the reduction of inductance of the coils L1, L2, the distance between the end portions of the cores I1, I2 and the inner surfaces of the side walls 402d, 402e of the case 402 may be enlarged. However, in this case, the case 402 becomes large, which causes the inverter unit to become large.

SUMMARY OF THE INVENTION

Accordingly, it is a principal object of the present invention to provide an inverter unit adapted to have a smaller coil constituting a filter than a conventional type so as to make the unit light and smaller.

The present invention is applied to an inverter unit comprising component parts including at least an inverter and a filter which removes high harmonic wave component from an output of the inverter. The component parts are housed in an aluminum box-like case having a bottom wall portion and a side wall portion. The filter includes a coil which is wound around a core extending straight and is disposed at a position closed to one end of the case, and an end portion of the core being wound with the coil is arranged closed to an inner surface of the side wall portion of the case. In the present invention, there is provided, at the end portion of the core, magnetic flux guiding member which guides magnetic flux coming in and out the end portion of the core arranged closed to the side wall portion of the case so as to direct the flux to the direction along the inner surface of the side wall portion of the case.

With the inverter unit constructed as aforementioned, it is possible to decrease the magnetic flux passing through the side wall portion of the case closed to the end portion of the core and restrain eddy current flowing at the side wall portion of the case. The eddy current flowing at the side wall portion of the case is decreased, which prevents magnetic resistance from being increased and prevents inductance of the coil to be decreased. Thus, a smaller coil of the filter than the conventional type can be used, and the inverter unit can be made light and smaller.

The aforementioned magnetic flux guiding member may be constructed of a ferromagnetic plate which has a surface larger than the end surface of the core and is disposed between the end portion of the core and the inner surface of the side wall portion of the case.

Also, the aforementioned magnetic flux guiding member may be constructed of a protrusion which integrally protrudes from the end portion of the core arranged closed to the inner surface of the side wall portion of the case along the inner surface of the side wall portion of the case and extends toward the other side of the bottom wall portion of the case.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 4 is a plan view of a main part of the inverter unit constructed in accordance with the second embodiment of the invention;

FIG. 5 is a sectional view taken along the line V—V of FIG. 4;

FIG. 6 is a circuit diagram illustrating an example of an electrical construction of the inverter unit;

DETAILED DESCRIPTION OF PREFERRED EMBODIMENTS

Figure 1:
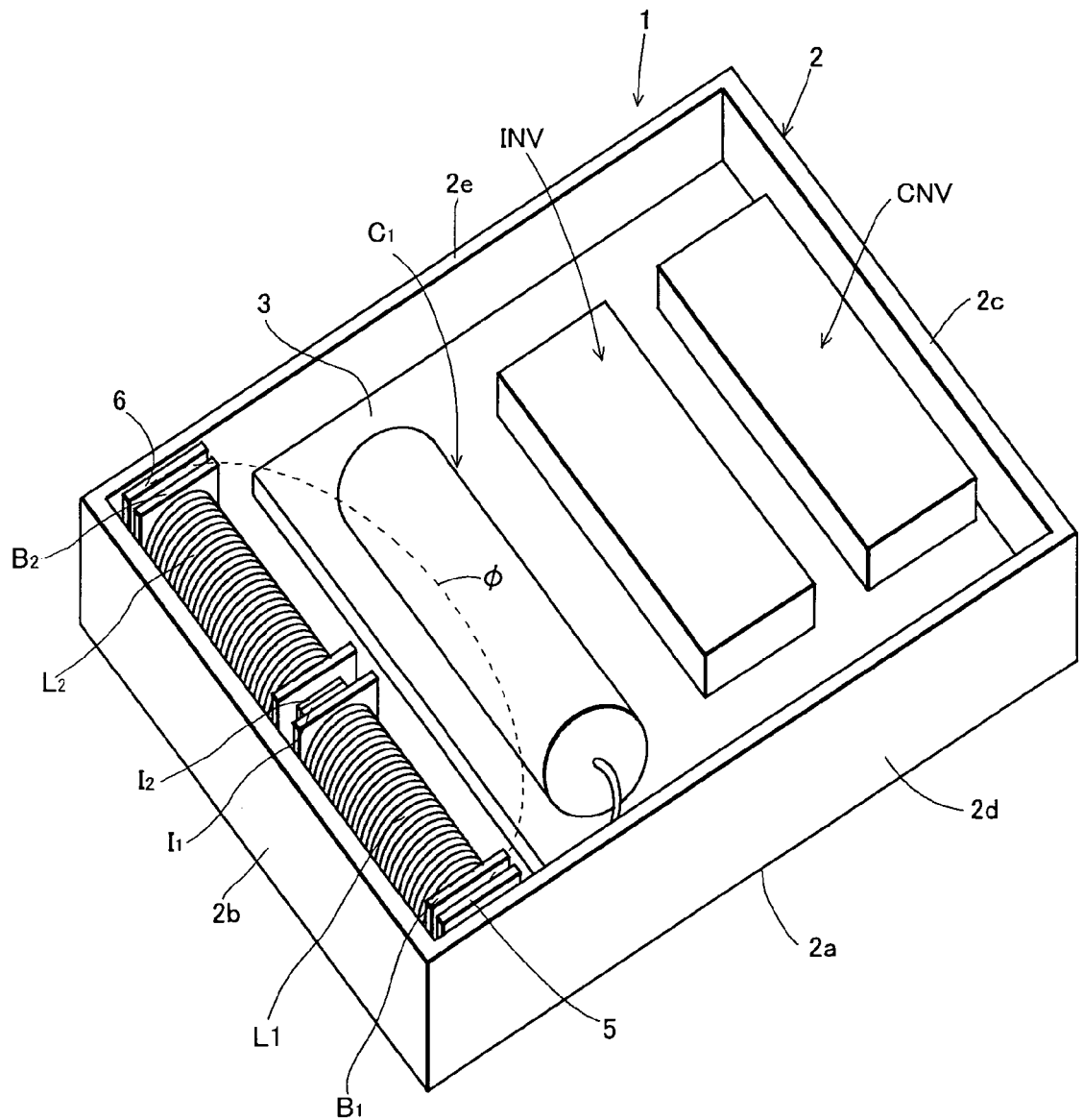
FIG. 1 is a schematic perspective view of the inverter unit constructed in accordance with the first embodiment of the invention.
Figure 2:
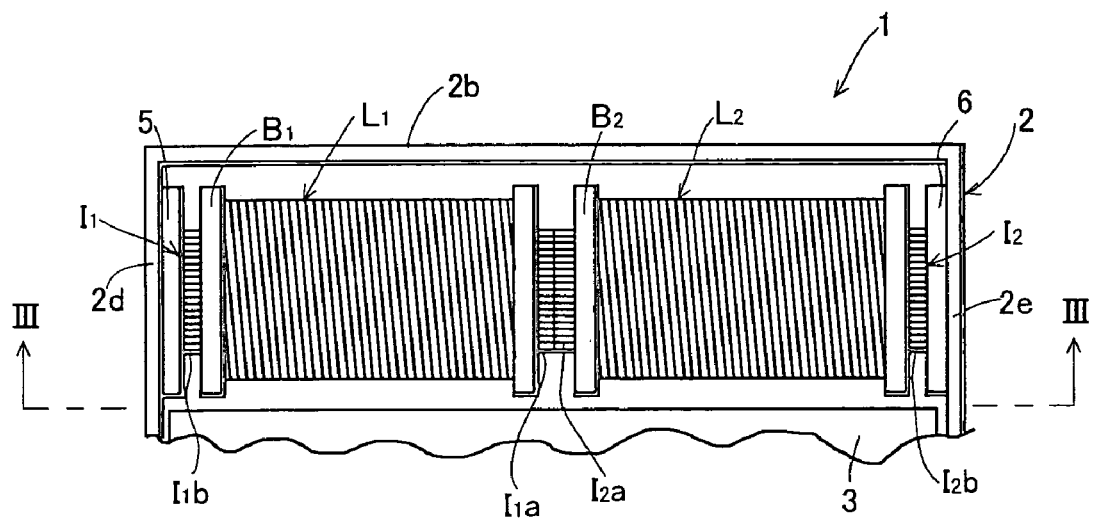
FIG. 2 is a plan view of a main part of the inverter unit shown in FIG. 1.
Figure 3:
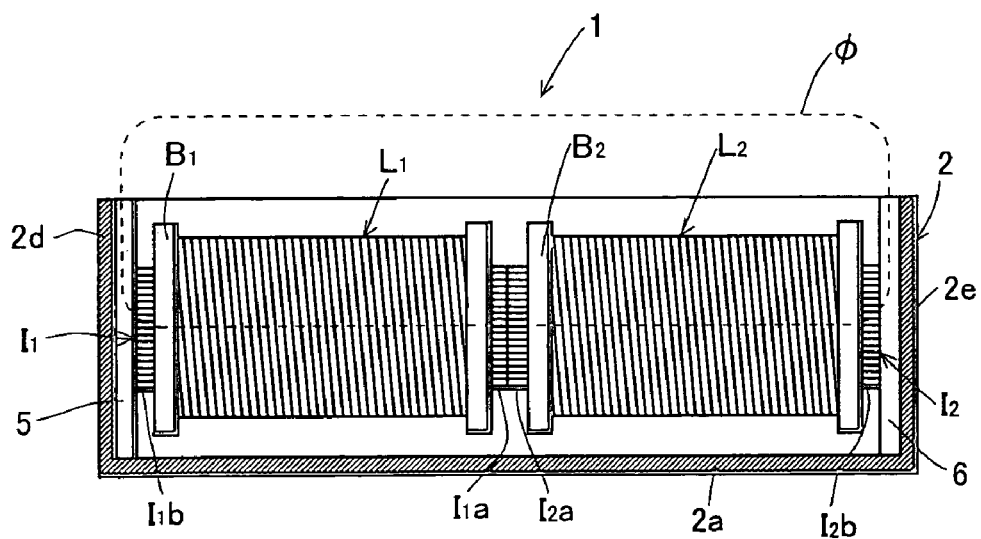
FIG. 3 is a sectional view taken along the line III—III of FIG. 2.
Figure 7:
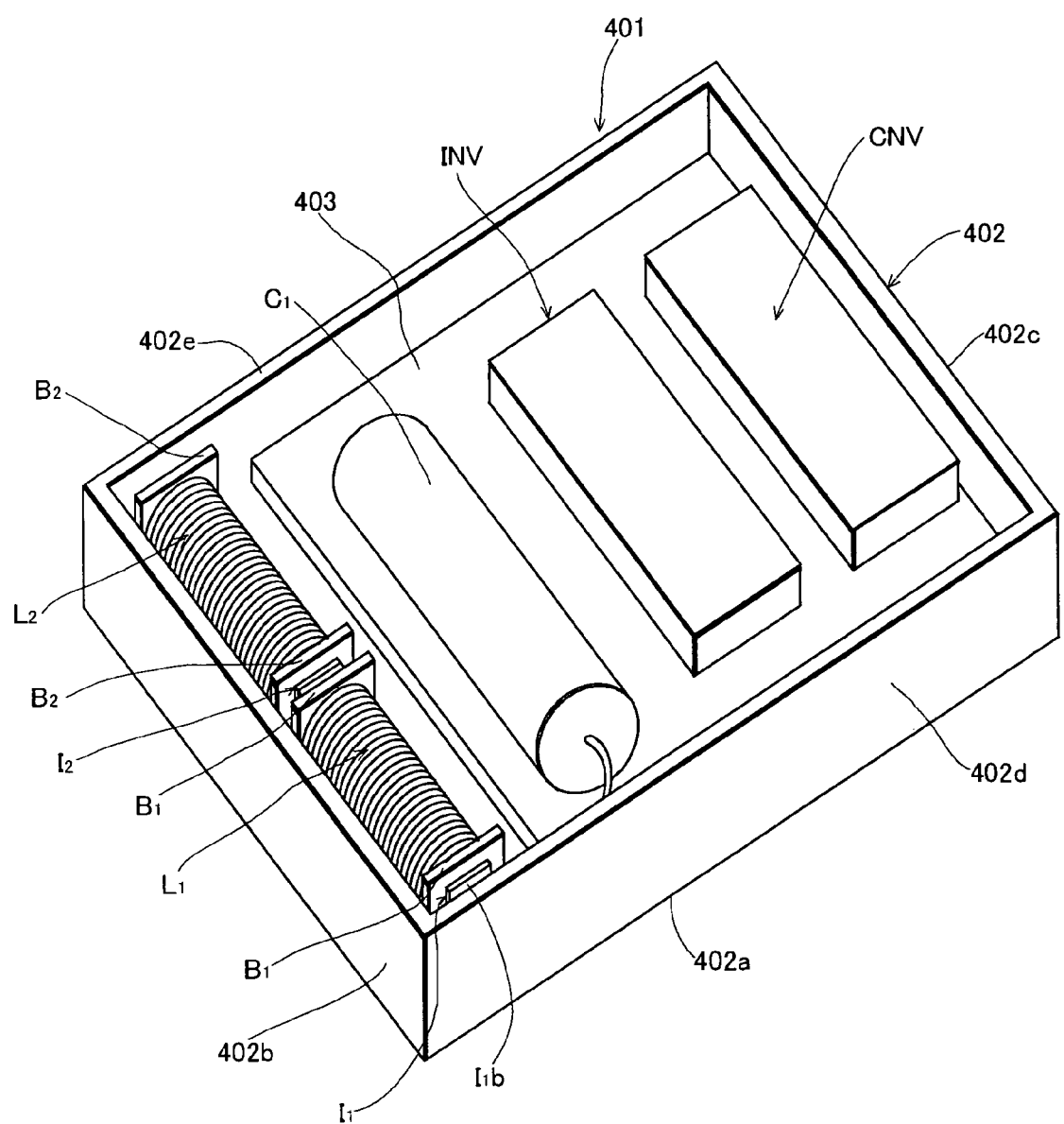
FIG. 7 is a schematic perspective view of a conventional inverter unit.

FIGS. 1 to 3 show the first embodiment of an inverter unit 1 according to the present invention. The inverter unit 1 includes, as same as the inverter unit shown in FIG. 6, a converter CNV, a inverter INV and a filter FL, and the filter FL is comprised of first and second coils L1, L2 and a capacitor C1.

In FIG. 1, a reference numeral 2 denotes a box-like case which is made of aluminum. The case 2 comprises a rectangular plate-like bottom wall portion 2a and a side wall portion. The side wall portion comprises a pair of side walls 2b, 2c facing to the longitudinal direction of the bottom wall portion 2a, and a pair of side walls 2d, 2e facing to the cross direction of the bottom wall portion 2a. In the case 2, there are stored component parts of the inverter unit, including the converter CNV, the inverter INV and the filter FL.

The first and second coils L1, L2 of the filter FL are wound around first and second bobbins B1, B2 mounted to first and second cores I1, I2, respectively. The first and second cores I1, I2 are prismatic cores, which is constituted by laminating a predetermined number of steel plates.

The coils L1, L2 are arranged at a position close to the side wall 2b which is on one end side of the longitudinal direction of the case 2, so that central axes of the coils coincide with each other and are directed to the cross direction of the case, and an end portion I1a of the first core I1 and an end portion I2a of the core I2 are respectively adjacent to each other. The other end portions I1b, I2b of the first and second core I1, I2 are arranged so as to be close to inner surfaces of a pair of the side walls 2d, 2e facing to the cross direction of the case.

The capacitor C1 and the component parts of the converter CNV and the inverter INV are mounted to a printed board 3 which is arranged on a space between the coils L1, L2 and the side wall 2c which is on the other end side of the longitudinal direction of the case 2.

In this embodiment, a first plate 5 is arranged between the other end portion I1b of the first core I1 and the side wall 2d of the case opposed to the other end portion I1b of the first core I1, and a second plate 6 is arranged between the other end portion I2b of the second core I2 and the side wall 2d of the case opposed to the other end portion I2b of the second core I2. The plates 5 and 6 constitute a magnetic flux guiding member which guides magnetic flux φ coming in and out the end portions I1b, I2b of the first and second cores so as to direct the flux to the direction along the inner surfaces of the side walls 2d, 2e of the case. The first and second plates 5, 6 are made of ferromagnetic material such as iron.

The first plate 5 is formed so as to include a portion existing between the other end portion I1b of the first core I1 and the side wall 2d of the case opposed to the other end portion I1b of the first core I1 and a portion extending beyond an outer edge of an end surface of the other end of the first core I1. Similarly, the second plate 6 is formed so as to include a portion existing between the other end portion I2b of the second core I2 and the side wall 2e of the case opposed to the other end portion I2b of the second core I2 and a portion extending beyond an outline of an end surface of the other end of the second core I2.

In the illustrated example, the first and second plates 5, 6 are rectangular shaped plates having a larger surface than the end surfaces of the first and second cores I1, I2, and these plates are arranged in a condition to be put between the other end portion I1b of the first core I1 and the side wall 2d of the case and between the other end portion I2b of the second core I2 and the side wall 2e of the case, respectively.

As aforementioned, in the case where the first and second plates 5, 6 made of ferromagnetic materials and having larger surfaces than the end surfaces of the first and second cores I1, I2 are arranged between the other end portion I1b of the first core I1 and the side wall 2d of the case opposed to the other end portion I1b of the first core I1, and between the other end portion I2b of the second core I2 and the side wall 2d of the case opposed to the other end portion I2b of the second core I2, respectively, and where the plates 5 and 6 constitute a magnetic flux guiding member which guides magnetic flux φ coming in and out the end portions I1b, I2b of the first and second cores so as to direct the flux to the direction along the inner surfaces of the side walls 2d, 2e of the case, it is possible to decrease an amount of magnetic flux passing through the side walls of the case since it can be easier for the magnetic flux φ to flow through a magnetic path which does not penetrate the wall portion of the case 2. Thus, eddy current flowing at the case is decreased, which can prevent magnetic resistance from being largely increased by the eddy current occurring at the case and prevent decrease in inductance of the coils which is caused by increasing magnetic resistance of the core.

As described above, according to the present invention, since it is possible to prevent that inductance of the coil is largely decreased by being affected by the eddy current flowing at the case, it is unnecessary to prepare a larger coil in anticipate that the inductance of the coil is decreased; thus, the inverter unit can be made light and smaller by using a smaller coil than the conventional type.

FIGS. 4 and 5 illustrate the second embodiment of the present invention. In this embodiment, protrusions 11, 12 are provided at the end portions I1b, I2b of the first and second cores I1, I2 opposed to a pair of the side walls 2d, 2e facing to the cross direction of the case 2. The protrusions 11, 12 are integrally protruding from the end portions I1b, I2b of the first and second cores I1, I2 and extending toward the opposite side of the bottom wall portion 2a of the case along the inner surfaces of the side walls 2d, 2e. The protrusions 11, 12 constitute the magnetic flux guiding member which guides the magnetic flux coming in and out the end portions of the cores so as to direct the flux to the direction along the inner surfaces of the side walls of the case.

In the illustrated example, at end portions of steel plates respectively constituting the cores I1, I2, there are provided bent portions bending perpendicular to the longitudinal direction of the steel plates, which form, at the end portions I1b, I2b of the cores I1, I2, the protrusions 11, 12 extending along the inner surfaces of the side walls 2d, 2e toward the other side of the bottom wall portion 2a of the case.

In the embodiment shown in FIGS. 1 to 3, there is provided a gap between the adjacent end portions of the bobbins B1, B2 wound with the coils L1, L2, respectively. However, in the embodiment shown in FIGS. 4 and 5, the adjacent end portions of the bobbins B1, B2 are butted without any gap. Other constructions of the embodiment shown in FIGS. 4 and 5 are the same as the embodiment shown in FIG. 1 to 3.

In the case where the protrusions 11, 12 extending and protruding toward the opposite side of the bottom wall portion 2a of the case are provided along the inner surfaces of the side walls 2d, 2e of the case at the end portions I1b, I2b of the cores I1, I2 as shown in FIGS. 4 and 5, it is possible to decrease an amount of magnetic flux passing through the side walls of the case since it can be easier for the magnetic flux φ to flow through a magnetic path which does not penetrate the side walls of the case 2. Thus, eddy current flowing at the case 2 is decreased, which can prevent magnetic resistance of the cores I1, I2 from being largely increased and prevent inductance of the coils to be decreased.

Furthermore, in the case where the protrusions 11, 12 protruding toward the opposite side of the bottom wall portion 2a of the case are provided at the end portions of the cores as shown in FIGS. 4 and 5, it is possible to decrease an amount of magnetic flux passing to the side of the bottom wall portion 2a of the case and decrease an eddy-current loss by decreasing the eddy current flowing at the bottom wall portion of the case, thereby restraining a generation of heat from the case.

Still, in the embodiment shown in FIGS. 4 and 5, it may be allowed to additionally provide protrusions protruding toward the side of the bottom wall portion 2a of the case from the end portions I1b, I2b of the cores I1, I2 other than the protrusions 11, 12 protruding toward the opposite side of the bottom wall portion 2a of the case from the end portions I1b, I2b of the first and second cores I1, I2. However, if the protrusions protruding toward the side of the bottom wall portion 2a of the case from the end portions I1b, I2b of the cores I1, I2 are provided, it is desirable to bring the length of the protrusions protruding toward the side of the bottom wall portion shorter than the length of the protrusions protruding toward the opposite side of the bottom wall portion, and make the magnetic resistance of the magnetic path which flows the magnetic flux through the protrusions protruding toward the opposite side of the bottom wall portion 2a from the end portions I1b, I2b of the cores I1, I2 smaller than the magnetic resistance of the magnetic path which flows the magnetic flux through the protrusions protruding toward the side of the bottom wall portion 2a from the end portions I1b, I2b of the cores I1, I2.

Although the coils L1, L2 are separately wound around the core I1, I2, respectively, in each embodiment described above, these coils may be wound around a common core; that is, the coils L1, L2 may be placed adjacently and wound around a long core which is a unity of the cores I1, I2.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. An inverter unit comprising component parts including at least an inverter and a filter which removes high harmonic wave component from an output of said inverter, in which:

said component parts are housed in an aluminum case having a bottom wall portion and a side wall portion;

said filter includes a coil which is wound around a core extending straight and is disposed at a position close to one end of said case, and said core has an end portion arranged close to an inner surface of said side wall portion of the case; and a magnetic flux guiding member, which guides magnetic flux coming in and out said end portion of the core so as to direct the flux to the direction along said inner surface of the side wall portion of said case, is provided at the end portion of the core.

2. An inverter unit as set forth in claim 1, wherein said magnetic flux guiding member is constructed of a ferromagnetic plate which has a surface larger than an end surface of said core and is disposed between the end portion of said core and the inner surface of the side wall portion of said case.

3. An inverter unit as set forth in claim 1, wherein said magnetic flux guiding member is constructed of a protrusion which protrudes from the end portion of the core arranged close to the inner surface of the side wall portion of said case along the inner surface of the side wall portion of said case and extends toward the opposite side of the bottom wall portion of said case.

4. An inverter unit comprising component parts including at least an inverter and a filter which removes high harmonic wave component from an output of said inverter, in which:

said component parts are housed in an aluminum box-like case having a bottom wall portion and a side wall portion;

said filter includes first and second coils wound around first and second cores extending straight, respectively;

said first and second coils are arranged so that central axes of said coils coincide with each other and that an end portion of said first core and an end portion of said core are adjacent to each other;

the other end portions of said first and second cores are arranged so as to be close to one and the other inner surfaces of said side wall portion facing each other;

first and second plates, made of ferromagnetic material, are arranged between the other end portion of said first core and the inner surface of the side wall portion of said case opposed to the other end portion of said first core, and between the other end portion of said second core and the inner surface of the side wall portion of said case opposed to the other end portion of said second core, respectively; and said first and second plates constitute magnetic flux guiding members which guide magnetic flux coming in and out the end portions of said first and second cores so as to direct the flux to the direction along said one and the other inner surfaces of the side wall portion of said case, respectively.

5. An inverter unit comprising component parts including at least an inverter and a filter which removes high harmonic wave component from an output of said inverter, in which:

said component parts are housed in an aluminum box-like case having a bottom wall portion and a side wall portion;

said filter includes first and second coils wound around first and second cores extending straight, respectively;

said first and second coils are arranged so that central axes of said coils coincide with each other and that an end portion of said first core and an end portion of said core are adjacent to each other;

the other end portions of said first and second cores are arranged so as to be close to one and the other inner surfaces of said side wall portion facing each other; and protrusions extending toward the opposite side of the bottom wall portion of said case along said one and the other inner surfaces of said side wall portion and provided at the end portions of said first and second cores opposed to said one and the other inner surfaces of the side wall portion.

* * * * *